United States Patent [19]

Correll, Sr. et al.

[11] 4,212,225
[45] Jul. 15, 1980

[54] MUNITION ARMING DEVICE

[76] Inventors: Curtis V. Correll, Sr., 1900 Bonita Dr., Glendale, Calif. 91208; William F. West, 12077 Kalua Dr., Sunland, Calif. 91040

[21] Appl. No.: 942,871

[22] Filed: Sep. 15, 1978

[51] Int. Cl.² ............................ F41F 5/02; B64D 1/04
[52] U.S. Cl. ................................ 89/1.5 D; 294/83 AA
[58] Field of Search ............... 89/1.5 D, 1.5 E; 102/2; 294/83 AA, 83 AE, 83 A, 83 R

[56] References Cited

U.S. PATENT DOCUMENTS

| | | | |
|---|---|---|---|
| 1,385,598 | 7/1921 | Weed | 89/1.5 D |
| 2,928,693 | 3/1960 | Cannon | 294/83 AA |
| 3,009,729 | 11/1961 | Eakin | 294/83 AA |
| 3,200,707 | 8/1965 | West | 89/1.5 D |
| 3,224,369 | 12/1965 | Dunn et al. | 294/83 AA |
| 3,628,821 | 12/1971 | Reece | 294/83 AA |
| 3,831,486 | 8/1974 | Yost | 89/1.5 D |
| 3,998,124 | 12/1976 | Milhous et al. | 89/1.5 D |
| 4,088,055 | 5/1978 | West et al. | 89/1.5 D |

Primary Examiner—David H. Brown
Attorney, Agent, or Firm—Fulwider, Patton, Rieber, Lee & Utecht

[57] ABSTRACT

An arming unit for selectively causing a munition to be discharged in a safe or an armed condition employs a two section armature. When a coil is energized, a gap between the sections is closed to block movement of a locking pin to prevent operation of a detent mechanism, thereby retaining an arming wire to apply an arming force to the munition. Armature movement is horizontal to render it unresponsive to high shock loads. The detent mechanism may include two mutually engaging curved surfaces that result in a fast acting release.

25 Claims, 9 Drawing Figures

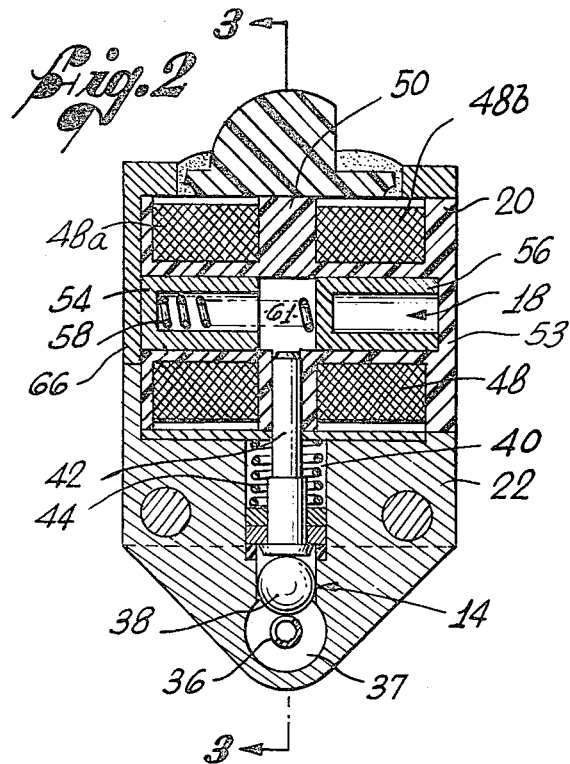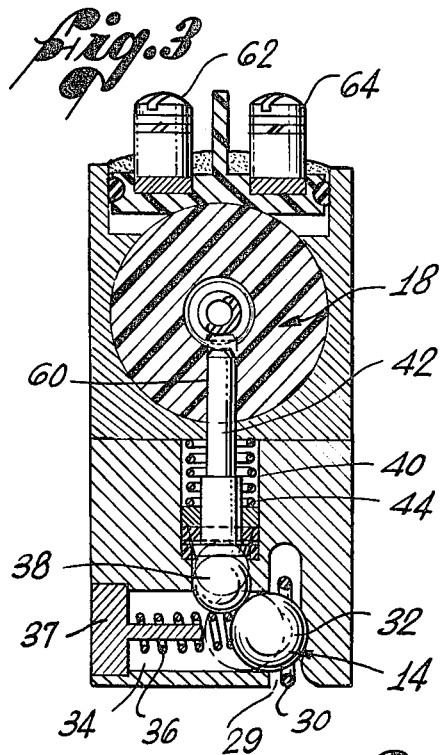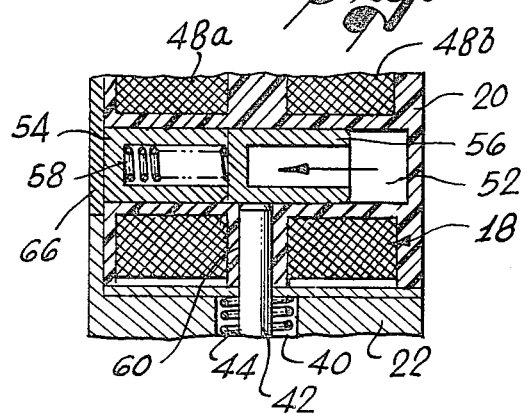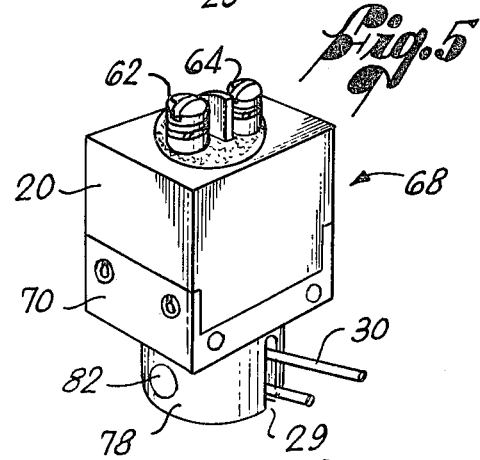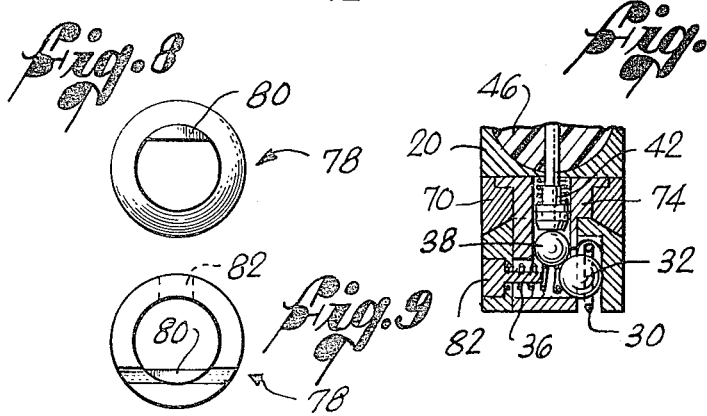

MUNITION ARMING DEVICE

BACKGROUND OF THE INVENTION

The present invention relates to arming devices and, more particularly, to a new and improved arming device characterized by simplicity, low cost of manufacture and high reliability.

When a munition is released from a bomb rack or otherwise discharged, it remains in a "safe" condition in which it will not detonate unless a wire connecting it to the aircraft on which it was carried is held by a sufficient force to arm the munition. This arming wire is secured to the aircraft by an arming unit such as that disclosed in U.S. Pat. No. 3,200,707. The arming unit normally retains the wire by a spring biased detent that will release the wire in response to a force too low to arm the munition. When it is desired to release the munition in an armed condition, a solenoid in the arming unit is energized to prevent operation of the detent thereby restraining the wire and applying an arming force to the munition.

The arming unit is often subjected to high vertical shock loads which may cause it to malfunction. It is preferable, therefore, to orient the solenoid horizontally (perpendicular to the pull of the wire) as explained in U.S. Pat. No. 4,088,055. It has been found, however, that the use of a horizontal solenoid increases the number of components required and the complexity of the device. In addition, it results in an asymmetrical design in which the detent mechanism is offset from the member that interacts directly with the horizontal solenoid resulting in an increase in friction within the unit when a force is applied to the wire. Frictional forces increase the resistance to the release of the wire when the solenoid is not energized and could result in the mechanism becoming hung up in an energized position despite de-energization of the solenoid. Nevertheless, the offset had been found necessary to achieve a lightweight component structure.

One objective of the present invention is to provide an arming unit with a horizontal coil that overcomes the above-mentioned disadvantages previously associated with this type of construction. A further objective is to provide such a device that is simple, requires a minimum number of components, and is manufacturable at a low cost. Still another objective is to provide such a device that has a fast-acting solenoid and detent mechanism and leads itself to the provision of a rotatable detent mechanism for multi-directional operation.

SUMMARY OF THE INVENTION

The present invention resides in an arming unit that accomplishes the above objectives through the use of a solenoid with a two-section armature. When energized, a gap between the armature sections is closed to prevent a locking member from moving between them, thereby preventing operation of a detent mechanism to release the wire.

Preferably, the armature sections are disposed end to end in an axial, horizontal opening through a coil and the locking member is a pin that moves vertically between the armature sections when the detent mechanism operates. A radial opening through the longitudinal center of the coil permits the desired pin movement. Springs can be used to bias the locking pin away from the armature and to bias the armature sections away from each other.

In a preferred arrangement, a housing is provided which has a magnetizable portion adjacent a first armature section, the area adjacent a second armature section being free of magnetizable material. Upon energization of the coil, both armature sections are drawn toward the magnetizable portion. The wire-engaging mechanism can be rotatably supported by the housing so that the device is multi-directional.

According to another aspect of the invention, the wire-engaging mechanism includes two movable members with mutually engaging part curved surfaces that provide a fast acting detent arrangement. These curved members may advantageously form parts of spheres and it is preferred that they form complete spheres.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 2 is a cross-sectional side view of the arming device of FIG. 1, the device being shown in a safe condition;

FIG. 3 is another cross-sectional side view of the arming device taken as indicated by the line 3—3 of FIG. 2;

FIG. 4 is a fragmentary cross-sectional view of the arming device, taken along the same plane as FIG. 2 but showing the armature and locking pin when the device is in an armed condition;

FIG. 5 is a perspective view, on a reduced scale, of another arming device constructed in accordance with the invention;

FIG. 6 is an exploded perspective view of several principle components of the device of FIG. 5;

FIG. 7 is a fragmentary, cross-sectional, side view of the rotatable detent mechanism of the device of FIG. 5;

FIG. 8 is a top plane view of a sleeve component of the detent mechanism of the device taken as indicated by the arrow 8—8 of FIG. 6; and FIG. 9 is a bottom plane view of the sleeve of FIG. 8.

DETAILED DESCRIPTION OF THE PREFERRED EMBODIMENT

Figure 1:
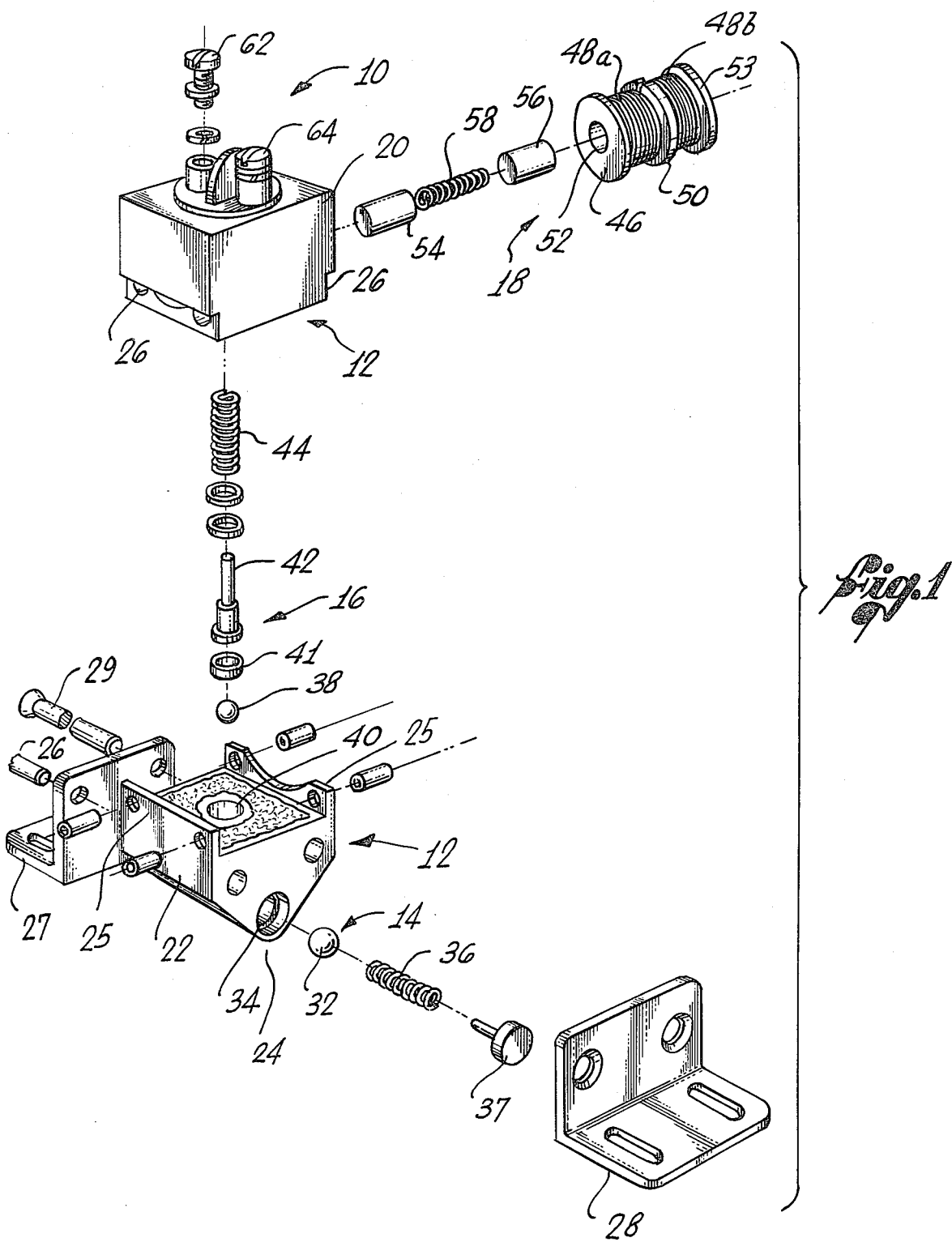
FIG. 1 is an exploded perspective view of an arming device constructed in accordance with the present invention (shown with two attachment brackets)

An arming unit 10, illustrated in FIGS. 1-4 of the accompanying drawings, embodies many features of the present invention. In general, it includes a housing 12, a wire-engaging detent mechanism 14, a locking mechanism 16 and a solenoid 18.

The housing 12 includes a generally rectangular, box-like upper part 20 and lower part 22 with a downwardly pointed bottom end 24. Narrow flanges 25 on opposite sides of the lower housing 22 interlock with indentations 26 on the lower edge of the upper housing 22. The housing 12 is secured to a bomb rack (not shown) by a pair of L-shaped brackets 27 and 28 that are attached to opposite sides of its lower part 22 by a pair of fasteners 29 (FIG. 1).

Disposed within the lower part 22 of the housing 12, the detent mechanism 14 utilizes a vertical slot 29 in the bottom of the housing in which a loop on the end of an arming wire 30 is received (FIG. 3). A first ball 32 is movable horizontally within a cavity 34 in the lower housing 22 and is biased by a spring 36 toward a position at one end of the cavity in which it extends across the slot 29 to retain the wire 30, the open end of the cavity being closed by a plug 37 to position the spring. A smaller second ball 38 is vertically reciprocable within a vertical center bore 40 in the lower housing 22 and rests on the top but to one side of the first ball 32. If the wire 30 is pulled downwardly, it will tend to displace the first ball 32 out of the slot 29 (toward the position shown in phantom lines in FIG. 3), forcing the second ball 38 upwardly within the vertical bore 40.

The interaction of the mutually engaging spherical surfaces of the two balls 32 and 38 should be noted. As the first ball 32 begins to move out of the slot 29, the common tangent at the point of intersection of the balls shifts more and more toward the horizontal. Thus, as the first ball 32 moves to release the wire 30, the force is applied vertically through the second ball 38 with a rapidly increasing mechanism advantage. The result is a very fast acting detent mechanism 14. Since the balls 32 and 38 are free to rotate, any tendency to form flat spots where they engage each other is avoided.

Bearing downwardly on the top of the second ball 38, through a ring 44, is a locking pin 42 that is vertically reciprocable within the bore 40 and is biased downwardly by a spring 44 that surrounds it. The top end of the spring 44 is positioned by its abutment against the bottom surface of the upper housing 20. The ring 41, the locking pin 42 and the spring 44 form the locking mechanism 16 of this exemplary embodiment.

Positioned horizontally across the top of the unit 10 within the upper housing 20 is the solenoid 18. It includes a generally cylindrical plastic bobbin 46 on which two series-connected sections 48a and 48b of a coil 48 are wound, the sections being at opposite ends of the bobbin and separated by a band 50 of increased diameter that is integrally molded with the rest of the bobbin.

A cylindrical axial opening 52 extends horizontally from one end of the bobbin 46 almost to an opposite closed end 53. Two similarly oriented, hollow, rod-shaped armature sections 54 and 56, each with one closed end, are freely slidable within the opening 52. The armature sections 54 and 56 are separated by an armature spring 58 that is seated within the first section 54 and engages the closed end of the second section 56 so that the sections are biased apart and toward opposite ends of the bobbin opening 52 (FIG. 2).

When the coil 48 is in a deenergizec condition, the locking pin 42 can travel upwardly in the vertical bore 40, through an extension of that bore of small diameter in the upper housing and through an aligned radial opening 60 in the band 50 at the longitudinal center of the bobbin 46 that intersects the axial bobbin opening 52. Thus, the locking pin 42, at the full extent of its upward travel, projects into a gap 61 between the two separated armature sections 54 and 56 (as shown in phantom lines in FIG. 3).

Accordingly, if a downward force is applied to the wire 30 with the coil 50 in a deenergized condition, the first ball 32 moves horizontally away from the wire and the second ball 38 is pushed up into the vertical bore 40 of the lower housing. The second ball 38, which serves as an intermediate member, lifts the locking pin 42 into its position between the armature sections 54 and 56. The only substantial resistance offered to this chain of movements is presented by the ball spring 36 and the locking pin spring 44 which must be compressed. The spring force is, however, many times less than the force required for arming and any munition released while the coil 48 is deenergized will remain in a safe condition.

When it is desired to release a munition in an armed condition, the coil 50 is energized through to electrical terminals 62 and 64 at the top of the housing 12. The armature sections 54 and 56 are thus temporarily magnetized and attract one another. At the one end of the axial bobbin opening 52, the first armature section 54 is attracted to an adjacent exposed sidewall 66 of the upper housing 20 which is made of a magnetizable metal. At the opposite closed end of the axial opening 52, however, there is no balancing attraction since the closed end 53 of the bobbin 46 is received by a circular opening in the upper housing 20 and there is no magnetizable material in that area. Accordingly, the first armature section 54 remains at the end of the axial opening 52 toward which it is biased by the armature spring 58 and the second armature section 54 moves to a position in which it abuts the first section while the armature spring 58 is compressed within the bore of the first armature section (FIG. 4). With the force of the second armature section 56 thus shifted, it covers the radial bobbin opening 60 and blocks the path of upward movement of the locking pin 42. Operation of the detent mechanism 14, which requires movement of the balls 32 and 38 is, therefore, prevented and the wire 30 is retained against the pull of a force sufficient to arm the munition.

It will be noted that the solenoid 18 is unusually fast-acting because the only part that must move when the coil 48 is energized is the second section of the core 56. Since this armature section does not carry any other component, its inertia is minimized. The cost of assembly is also minimized because neither section 54 or 56 of the armature need be secured to the bobbin 46 or the housing 12, both sections being freely movable in the bobbin bore 52. Vertical shocks have little or no effect on the operation of the solenoid 18 since movement of the armature section 56 is horizontal, perpendicular to the movement of the locking pin 42.

The construction of an arming unit in accordance with the invention lends itself well to the provision of a rotatable detent mechanism 14, as in an exemplary arming unit 68 shown in FIGS. 5 and 6, components of this unit 68 which correspond to those of the unit 10 being indicated by the same reference members. Instead of the pointed lower housing 22, a lower housing 70 and in the unit 68 is flat and generally rectangular, having round vertical opening 72 therein. Rotatably disposed within this opening 72 is a generally cylindrical carrier 74 having a circumferential flange 76 on its top end that rests in a counter bore 77 (FIG. 6) surrounding the top of the opening 72 and prevents the carrier from moving downwardly. The lower end of the carrier 74 is encircled by a sleeve 78 which defines the slot 29 in which the wire 30 is received, one side 79 of the carrier 74 being flattened so as not to obstruct the slot. An internal projection 80 on the sleeve 78 (FIGS. 8 and 9) engages the flat side 79 of the carrier so that the sleeve 78 and carrier are locked together for joint rotation.

The vertical bore 40 that contains the locking pin 42 and the second ball 38 is axially disposed in the center of the carrier 74 (FIG. 7). Since the pin 42 is centered in the carrier 74, the carrier and sleeve 78 can rotate freely about the pin 42. The cavity 34 that contains the first ball 32 is formed by a horizontal bore in the carrier 74 and the detent spring 36 is positioned by a plug 82 in an opening in the sleeve 78 that is aligned with the bore 34.

The rotatability of the detent mechanism 14 relative to the housing 12 permits the slot 29 to align itself with the direction of pull of the wire 30. This rotatability prevents the wire 30 from binding against the sides of the slot 29 in the event of a transverse component of motion of the munition as it falls away from an aircraft from which it is released.

It will be noted that both of the arming units 10 and 68 described above are characterized by simplicity and relative ease of manufacture, combined with a high degree of reliability. While particular forms of the invention have been disclosed, it will be apparent that various modifications can be made without departing from the spirit and scope of the invention.

We claim:

1. An arming device for selectively allowing a munition to be discharged in a safe condition or in an armed condition comprising:
   arming wire-engaging means for normally retaining an arming wire and for releasing said wire upon operation thereof;
   locking means for selectively preventing operation of said wire-engaging means, said locking means including a locking member cooperating with said wire-engaging means for movement along a predetermined path in response to operation of said wire-engaging means; and
   solenoid means for preventing movement of said locking means when in an energized condition and thereby preventing operation of said wire-engaging means to release said wire, said solenoid means comprising first and second armature sections normally disposed on opposite sides of said path when said solenoid means is not energized, and a coil electromagnetically associated with said armature sections, at least one of said armature sections being movable with respect to the other to block said path upon energization of said coil.

2. The arming device of claim 1 further comprising resilient means for biasing said second armature section away from said first armature section.

3. The arming device of claim 1 wherein at least one of said armature sections is movable in a direction perpendicular to said path.

4. The arming device of claim 1 further comprising means for rotatably connecting said wire-engaging means to said solenoid means.

5. The arming device of claim 1 wherein at least a portion of said locking means is movable along said path between a first position in which it is not disposed between said first and second armature sections and a second position in which it is disposed between said first and second armature sections.

6. The arming device of claim 5 further comprising resilient means for urging said locking means toward said first position.

7. The arming device of claim 1 further comprising a housing having a magnetizable portion adjacent said first armature section.

8. The arming device of claim 7 wherein the area adjacent said second armature section is free of magnetizable material.

9. The arming device of claim 1 wherein said wire-engaging means includes first and second members each having a curved surface, said curved surfaces being mutually engaging;
   said first member being engageable with said wire and said second member being engageable with said locking means.

10. The arming device of claim 9 wherein each of said curved surfaces forms a part of a sphere.

11. An arming device for selectively allowing a munition to be discharged in a safe condition or in an armed condition comprising:
   arming wire-engaging means normally retaining an arming wire and for releasing said arming wire upon operation thereof;
   a locking pin connected to said wire-engaging means for movement along a predetermined path upon operation thereof; and
   solenoid means comprising a coil defining an axial opening therethrough disposed perpendicular to said path and arranged so that said pin is movable into said axial opening, first and second armature sections disposed within said axial opening, and spring means for urging said armature sections apart to permit said locking pin to move therebetween, said armature sections being magnetically attracted to each other against the force of said spring to block movement of said locking pin along said path when said coil is energized.

12. The arming device of claim 11 further comprising additional spring means for urging said locking pin away from said solenoid means.

13. The arming device of claim 11 further comprising means for rotatably connecting said wire-engaging means to said solenoid means.

14. The arming device of claim 11 wherein said wire-engaging means includes first and second members each having a curved surface, said curved surfaces being mutually engaging;
   said first member being engageable with said wire and said second member being engageable with said locking pin.

15. The arming device of claim 14 wherein each of said curved surfaces forms a part of a sphere.

16. The arming device of claim 14 wherein each of said member is a sphere.

17. The arming device of claim 11 further comprising a housing having a magnetizable portion adjacent said first armature section.

18. The arming device of claim 17 wherein the area adjacent said second armature section is free of magnetizable material.

19. The arming device of claim 18 wherein both of said armature sections are freely movable within said axial opening.

20. An arming device for selectively allowing a munition to be discharged in a safe condition or in an armed condition comprising:
   a housing;
   arming wire-engaging means disposed within said housing for normally retaining an arming wire and for releasing said arming wire upon movement thereof;
   a vertical locking pin reciprocably disposed within said housing and connected to said wire-engaging means for movement upon operation thereof;
   a coil horizontally disposed within said housing having a vertical radial opening at the longitudinal center thereof aligned with said pin and a horizontal axial opening intersected by said radial opening, whereby said pin can move vertically through said radial opening into said axial opening;

first and second armature section disposed end to end and movable within said axial opening;

first spring means biasing said armature sections apart to permit said pin to move through said radial opening into a position between said armature sections; and second spring means biasing said pin downwardly away from said axial opening;

said housing having a magnetizable portion adjacent said first armature section, the area adjacent said second armature section being free of magnetizable material, whereby said first and second armature sections are attracted to said magnetizable housing portion causing said second section to move toward said first armature section, blocking movement of said pin upon energization of said coil.

21. The arming device of claim 20 further comprising means for rotatably connecting said wire-engaging means to said solenoid means.

22. The arming device of claim 20 wherein said wire-engaging means includes two mutually engaging spherical members, one engageable with said wire and the other engageable with said pin.

23. An arming device for selectively allowing a munition to be discharged in a safe condition or an armed condition comprising:

a locking member;

solenoid means for preventing movement of said locking member upon energization thereof to permit a munition to be discharged in an armed condition;

a wire engaging member;

an intermediate member disposed between said wire engaging member and said locking member; and a housing in which said wire engaging member is confined for substantially horizontal movement and said intermediate member is confined for substantially vertical movement;

said wire engaging member and said intermediate member having mutually engaging curved surfaces.

24. The arming devise of claim 23 wherein said curved surfaces form parts of spheres.

25. The arming device of claim 23 wherein said wire-engaging member and said intermediate member are both spherical.

* * * * *